United States Patent Office 3,190,506
Patented June 22, 1965

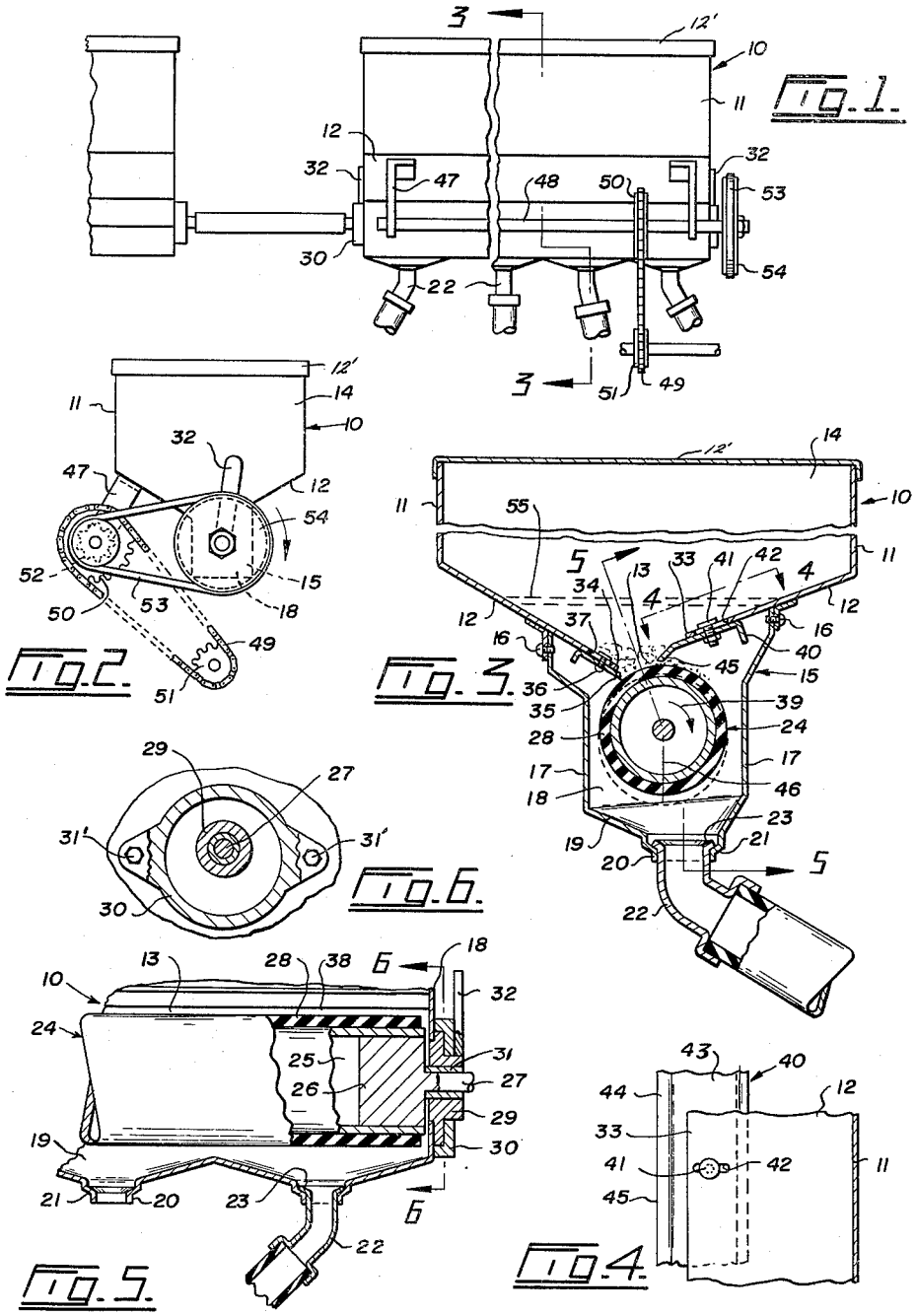

3,190,506
FERTILIZER DISTRIBUTOR ATTACHMENT
Edwin M. Selzler, 3410 31st St. SW., Calgary,
Alberta, Canada
Filed July 8, 1963, Ser. No. 293,296
2 Claims. (Cl. 222—314)

My invention relates to new and useful improvements in fertilizer attachments specifically designed for attachment to conventional seeders.

Normally, such devices utilize an auger feed system in combination with some form of metering device, in order to distribute the fertilizer to the seed drills. However, it is difficult to get accurate feeding and distribution of the fertilizer and in view of the relatively high concentration of new chemical fertilizers, it becomes important to control accurately the amount of fertilizer being distributed.

Furthermore, such auger type distributors are difficult to clean out and with present day chemical fertilizers, any fertilizer left in the assembly, tends to cement and causes corrosion to occur to the structure.

I have overcome these disadvantages by providing a fertilizer distributor which utilizes a resiliently covered roller to pick up a relatively thin layer of fertilizer from the hopper and to deposit same within the distributor manifold, such method being extremely accurate in the amount of fertilizer so picked up and which furthermore includes means to drop the roller a limited amount when it is desired to empty the device, so that the fertilizer runs out of the hopper by gravity thus enabling it to be kept clean and empty when not in use.

The principal object and essence of my invention is therefore to provide a fertilizer distributor attachment which enables chemical fertilizer to be fed to the grain drills accurately and without powdering or crushing occurring.

Another object of my invention is to provide a device of the character herewithin described which includes means whereby the fertilizer distributor can be cleaned out readily after use.

Yet another object of my invention is to provide a device of the character herewithin described which is easily mounted upon an existing grain drill machine.

Still another object of my invention is to provide a device of the character herewithin described which includes means whereby the rate of feed can be preset at the factory so that a predetermined volume of fertilizer will be distributed.

Still another object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of my device.

FIGURE 2 is an end elevation thereof.

FIGURE 3 is a sectional view enlarged with respect to FIGURES 1 and 2, and taken along the line 3—3 of FIGURE 1.

FIGURE 4 is a fragmentary view taken along the line 4—4 of FIGURE 3.

FIGURE 5 is a partially sectioned view substantially along the line 5—5 of FIGURE 3.

FIGURE 6 is a fragmentary sectional view taken along the line 6—6 of FIGURE 5.

In the drawings like characters of reference indicate corresponding parts in the different figures.

Proceeding therefore to describe my invention in detail, reference should be made to the accompanying drawings in which 10 illustrates generally an elongated fertilizer hopper comprising substantially vertical side walls 11 and downwardly converging side walls 12. The side walls 12 terminate in a spaced apart relationship thus forming an elongated fertilizer feed aperture 13 at the base of the hopper 10. A cover 12′ fits over the upper side walls 11 of the hopper and, in conjunction with end walls 14, form an enclosure.

A fertilizer distributor casing collectively designated 15 is secured to the underside of the hopper by means of brackets and bolts 16. This distributor casing includes side walls 17, end walls 18, and encloses the feed aperture 13 as clearly shown.

The base 19 of the distributor or manifold is shaped as shown in FIGURES 1 and 5 to form a plurality of spout pockets or collars 20 within the base thereof and these pockets are provided with flanged portions 21.

A moulded rubber spout 22 is provided with a corresponding flange 23 and these are adapted to be pushed downwardly through the spout pockets 20 and to be held frictionally therewithin as clearly shown.

The fertilizer distributor tubes 23 are then secured to these spouts 22 and it will be noted that these spouts can be positioned radially within the pockets to suit various conditions of assembly.

Feed roller means collectively designated 24 are situated within the distributor or manifold 15. The feed roller comprises a cylindrical tube 25 having plug ends 26, said plug ends having stub shafts 27 formed thereon thus providing means for mounting the roller as will hereinafter be described.

A rubber or similar resilient material sleeve 28 is engaged over the cylindrical tube 25 and cemented in position, said sleeve extending the entire end of the cylinder 25.

This roller assembly is mounted for rotation within the end walls 18 of the distributor or manifold and is positioned just below the aforementioned aperture 13 within the base of the hopper 10.

References to FIGURES 5 and 6 will show the method of mounting the roller for rotation comprising a bushing 29 held within the end walls 18 of the distributor casing by means of flanged end plates 30 secured to the wall by means of bolts 31′.

The bushings 29 are drilled eccentrically or off centre to receive bearings 31 within which are journalled the stub shafts 27 of the roller assembly.

A lever 32 is secured to each of the bushings 29 so that the bushings can be rotated through approximately 180° within the end caps 30.

When the bushings are in the position shown in FIGURE 5, the eccentricity of the positioning of the bearings 31 is such that the roller assembly is adjacent the aforementioned aperture 13 and in the fertilizer feeding position.

However, when the levers are rotated through approximately 180° the eccentricity of the bearing mounting within the bushings causes the rollers to drop away from the aperture 13 to take up the position shown in phantom in FIGURE 3 thus enabling the fertilizer to drain from the hopper by gravity in order that the hopper may be emptied.

Reference should next be made to FIGURE 3 and in particular to the boundary edges 33 and 34 of the aperture 13.

Dealing first with the boundary edge 34, a stainless steel strip 35 is adjustably secured by means of bolts 36 and elongated slots 37, to adjacent the boundary edge and this strip is positioned during assembly so that it is just in wipe contact with the surface 38 of the rubber covered roller assembly. This is so that when the roller assembly rotates in the direction of arrow 39, no fertilizer can leak back past the roller assembly to the distributor casing 15.

A metering strip collectively designated 40 is adjustably secured for limited positioning to adjacent the edge 33 of the aperture 13. This metering strip is also secured by means of bolts 41 passing through elongated slots 42.

The metering strip includes the elongated mounting plate portion 43 and a downturned angulated metering strip portion 44 clearly shown in FIGURE 3 and it should be noted that the free edge 45 of this metering strip portion is situated behind top dead center of the roller assembly indicated by the reference character 46. This is to prevent fertilizer from passing from the hopper assembly 10 to the distributor casing 15 unless the roller assembly is rotating.

This elongated metering strip 40 is adjusted during manufacture so that a relatively fine layer of fertilizer can pass between the edge 45 and the surface of the roller.

FIGURE 2 shows details of the means to drive the roller and comprises a pair of brackets 47 secured to the underside of the hopper and supporting a jack shaft 48 for rotation therebetween.

Chain 49 extends around a sprocket 50 upon the jack shaft and a further sprocket 51 which may be connected to a convenient point upon the seeder and be driven thereby.

Also secured to the jack shaft is an adjustable V-pulley assembly 52 carrying V-belt 53 thereon, said belt also extending around the further adjustable V-pulley 54 secured to the stub shaft 27 of the roller assembly 24.

The adjustable V-pulley assemblies 52 and 54 are conventional in design and may be utilized to obtain the desired speed of rotation of the roller assembly 24.

A screen 55 spans the base of the hopper spaced above the aperture 13, said screen being made of expanded metal or some similar material. This prevents the fertilizer from packing too heavily around the aperture 13, keeps out large lumps of fertilizer and foreign material, and generally assists in the even feeding of the fertilizer by the roller assembly.

In operation, the roller assembly is rotated in the direction of arrow 39. The resilient surface of the roller assembly picks up a layer of fertilizer and passes under the edge metering strip 44 to be deposited by gravity into the distributor casing 15 and thence to the distributor tubes 23. This means that a curtain of fertilizer is fed by the roller and the gap between the edge 45 of the metering strip assembly and the surface of the roller controls the amount of fertilizer picked up by the roller assembly.

By adjusting the gap, extreme accuracy of metering is obtained and packing is prevented as any fertilizer moved by the layer immediately in contact with the roller rides up the sloping portion of the metering strip 44 and does not interfere with the layer which is passing between the strip and the roller surface.

When it is desired to clean out the machine, the fertilizer tubes 23 may be disconnected, the roller drops to the position shown in phantom in FIGURE 3, thus permitting the fertilizer to drain completely from the machine by gravity.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A fertilizer attachment for seeding devices comprising in combination an elongated fertilizer hopper, an elongated fertilizer feed aperture in the base thereof, a fertilizer tube distributor casing secured to the underside of said hopper and communicating therewith via said fertilizer feed aperture, feed roller means journalled for rotation within said distributor casing and below said feed aperture, said feed roller means including a cylindrical feed roller and a resilient covering sleeve secured around said feed roller, means to drive said feed roller means, means secured to one of the boundary edges of said feed aperture cooperating with said feed roller means, for metering the quantity of fertilizer fed by said feed roller means from said hopper to said distributor casing, said means secured to said one boundary edge of said feed aperture, comprising an elongated plate, means adjustably securing said plate to said boundary edge for limited adjustment of said plate with relation to the surface of said feed roller means, said plate including a main securing portion and a downwardly angulated metering strip portion, the longitudinal edge of said metering strip portion being above and parallel to said feed roller means and in advance of the top dead center position of said feed roller means when viewed in end elevation.

2. The device according to claim 1 in which said means mounting said feed roller means includes a bushing journalled for partial selective rotation within each end of said distributor casing, said feed roller means being journalled for rotation within said bushings, off center of said bushings, and a positioning lever secured to one of said bushings whereby said bushing can be rotated, within limits, thereby positioning said feed roller means in the said fertilizer distributor position adjacent said elongated feed aperture within said hopper, and in the hopper clean out position, spaced apart from said aperture.

References Cited by the Examiner

UNITED STATES PATENTS

| 817,271 | 4/06 | Perks | 308—62 X |
|---|---|---|---|
| 2,065,717 | 12/36 | Marlsdale | 222—314 |
| 2,237,504 | 4/41 | Roath | 222—314 X |
| 2,603,383 | 7/52 | Wilson | 222—414 X |
| 2,637,070 | 5/53 | Nichols et al. | 222—312 X |
| 2,737,319 | 3/56 | Rayburn | 222—312 |
| 2,865,536 | 12/58 | Price | 222—414 X |

LOUIS J. DEMBO, *Primary Examiner.*